United States Patent
Johnson et al.

(10) Patent No.: US 7,181,588 B2
(45) Date of Patent: Feb. 20, 2007

(54) COMPUTER APPARATUS AND METHOD FOR AUTONOMIC ADJUSTMENT OF BLOCK TRANSFER SIZE

(75) Inventors: David LeRoy Johnson, Pine Island, MN (US); Michael Lawrence Nordstrom, Rochester, MN (US); Joan Marie Ries, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/443,704

(22) Filed: May 22, 2003

(65) Prior Publication Data
US 2004/0236924 A1    Nov. 25, 2004

(51) Int. Cl.
*G06F 13/00*    (2006.01)

(52) U.S. Cl. ................ 711/173; 711/153; 711/154; 711/166

(58) Field of Classification Search ............... 711/153, 711/154, 166, 173
See application file for complete search history.

(56) References Cited

U.S. PATENT DOCUMENTS 5,727,002 A * 3/1998 Miller et al. ............ 714/748

* cited by examiner

*Primary Examiner*—Reba I. Elmore
(74) *Attorney, Agent, or Firm*—Martin & Associates LLC; Derek P. Martin

(57) ABSTRACT

A dynamic block transfer size adjustment mechanism independently defines block transfer size for each memory portion, which may include files in a file system, virtual storage segments in a memory system, or extents in physical storage. By specifying block transfer size for a memory portion independently from other memory portions, the performance of the computer system may be enhanced. In addition, the block transfer size of one or more memory portions may be dynamically adjusted according to how the memory portion is used. In an alternative embodiment, the block transfer size may also be specified for each process that accesses a portion of memory. Thus, a single file may be accessed with a first block transfer size by a first process, and may be accessed with a second (different) block transfer size by a second process. By providing the ability to independently set block transfer size for portions of memory, and to dynamically adjust those values according to the historical use of the portion of memory, the performance of a computer system is enhanced.

21 Claims, 6 Drawing Sheets

```
Class BlockTransferTracker {
/* Data elements */
Time lastEvalTime; /* Time of last evaluation. It is the create time if
                no evaluations have been attempted. */
integer operation_Count_During_Evaluation_Interval;
integer evaluation_Number;
integer start_Up_Evaluations;
integer total_Bytes_Read_Or_Written;
integer total_Logical_PageCrossings;
integer historicalBlockTransferSizes [M];
operation(integer data_Length);
logicalPageCrossing(integer number_Of_Crossings_During_Operation);
BlockTransferTracker(); /*Constructor */
~BlockTransferTracker(); /*Destructor */

Private Member Functions:

Integer calculate_New_Block_Transfer_Size();
Integer Dampen_Block_Transfer_Size_Dchange(integer
suggested_Size);

Operation (integer data_Length)
{
        operation_Count_During_Evaluation_Interval =
operation_Count_During_Evaluation_Interval +1;                    − 610
        total_Bytes_Read_Or_Written = total_Bytes_Read_Or_          − 620
Written + data_Length;
        if operation_Count_During_Evaluation_Interval > Some_Limit − 630
AND currentTime - lastEvaluationTime >
MAX_EVALUATION_INTERVAL then {
            new_Block_Transfer_Size = getNewBlockTransferSize();   − 640
            advanceEvaluationCounters();                           − 642
            addCurrentStatisticsToHistory();                       − 644
            reset_Current_Statistics();                            − 646
        }
}
```

FIG. 6

```
Read_Function (BlockTransferTracker
&blockTransferTracker,Integer data_Length_Of_Read, ...)
{
        Move_Date_From_File_Into_User_Buffer(                    — 710
blockTransferTracker, ...)
        blockTransferTracker.operation(data_Length_Of_Read);     — 720
}
```

FIG. 7

```
Move_Data_From_File_Into_User_Buffer(BlockTransferTracker
&blockTransferTracker)
{
        For each segment being touched by this read do the following:
        a) determine the location wtihin the segment where the data
starts
        b) Determine where within the segment the data ends
        c) Determine how many logical page crossings will occur when
the data is moved from the segment into the user buffer
        d) use the blockTransferTracker.logicalPageCrosser(crossers)
to inform the block transfer tracking object as to how many logical
crossings were encountered during the read of this segment
}
```

FIG. 8

COMPUTER APPARATUS AND METHOD FOR AUTONOMIC ADJUSTMENT OF BLOCK TRANSFER SIZE

BACKGROUND OF THE INVENTION

1. Technical Field

This invention generally relates to computer systems, and more specifically relates to apparatus and methods for performing storage operations in a computer system.

2. Background Art

Since the dawn of the computer age, computers have evolved and become more and more powerful. In our present day, computers have become indispensable in many fields of human endeavor including engineering design, machine and process control, information storage and retrieval, and office computing.

Memory in a computer system is often comprised of many different levels in a hierarchy according to the memory capacity and speed. For example, most modern computer systems include a cache memory that is relatively small but very fast. Main memory, such as Random Access Memory (RAM), is typically larger than the cache, but slower. Bulk storage devices, such as hard disk drives, provide great capacity and typically retain their contents when the system is powered down, but have a speed that is relatively slow compared to cache and RAM. Because of the varying speeds of accessing information in these different types of memory devices, memory systems have been developed that automatically transfer data to and from different portions of the memory system as the data is needed. One common scheme for accessing data is known as a memory paging system that divides memory into multiple pages. When data in a page is needed, the page is typically read from the bulk storage device into main memory, and the data is then accessed in main memory. Many memory managers use a Least Recently Used (LRU) scheme for page replacement. Thus, when the portion of memory dedicated to paging is full of pages, and a new page needs to be brought into memory from bulk storage, the oldest page (least recently used) is replaced with the new page.

One system parameter that affects performance of a computer system is the size of a block that is read into memory from bulk storage at one time. This is commonly known as the block transfer size. For example, if a page is defined to be 4 kilobytes (4K), the block transfer size could be set to a single page (4K), to two pages (8K), to three pages (12K), etc. The block transfer size affects the system performance because it determines how much data is retrieved when a page fault occurs. In a system that has lots of memory, a large block transfer size generally improves performance because fewer page fault operations are needed to retrieve data. However, a large block transfer size may result in performance degradation in a system that has constrained memory resources. If the memory is limited, more page faults occur. With a large block transfer size, this means that more pages are being replaced at one time, potentially leading to more page faults that result from attempting to access a page that is no longer in memory. We see from these simple examples that the block transfer size can affect system performance, but the desired value of the block transfer size depends on whether or not memory is constrained. Note also that memory may be constrained at some instances in time (such as when running several large batch jobs), while the same memory may not be constrained at other times. For this reason, the selection of a static block transfer size often leads to a system that may suffer from performance degradations under certain conditions.

In the prior art, a default block transfer size is specified for each type of file in the system. In other words, when a computer system is initialized, a block transfer size is typically specified for each file type. This is shown in method 200 depicted in the flow diagram of FIG. 2. A default block transfer size is set to a desired value for all files of a selected file type (step 210). From that point on, the operating system accesses files using the default block transfer size for files of that type (step 220).

In the prior art, the fixed block transfer size for a particular file type creates inefficiencies under certain circumstances. Without an apparatus and method for dynamically changing block transfer size, the computer industry will continue to suffer from inefficiencies caused by specifying a fixed block transfer size for all files of a particular type.

DISCLOSURE OF INVENTION

According to the preferred embodiments, a dynamic block transfer size adjustment mechanism independently defines block transfer size for each memory portion, which may include files in a file system, virtual storage segments in a memory system, or extents in physical storage. By specifying block transfer size for a memory portion independently from other memory portions, the performance of the computer system may be enhanced. In addition, the block transfer size of one or more memory portions may be dynamically adjusted according to how the memory portion is used. In an alternative embodiment, the block transfer size may also be specified for each process that accesses a portion of memory. Thus, a single file may be accessed with a first block transfer size by a first process, and may be accessed with a second (different) block transfer size by a second process. By providing the ability to independently set block transfer size for portions of memory, and to dynamically adjust those values according to the historical use of the portion of memory, the performance of a computer system is enhanced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 6 is a diagram that shows pseudo-code for a BlockTransferTracker class in accordance with the preferred embodiments;

FIG. 7 is a diagram that shows pseudo-code for a Read_Function( ) method in accordance with the preferred embodiments; and FIG. 8 is a diagram that shows pseudo-code for a Move_Data_From_File_Into_User_Buffer( ) method in accordance with the preferred embodiments.

BEST MODE FOR CARRYING OUT THE INVENTION

The preferred embodiments provide an apparatus, method and program product that allows block transfer size to be specified for a relatively small portion of memory, such as for a file or for a virtual storage segment. Once specified, the block transfer size may then be dynamically adjusted according to how the memory portion is used. In this manner, system performance may be optimized by dynamically adjusting block transfer size as needed.

Figure 1:
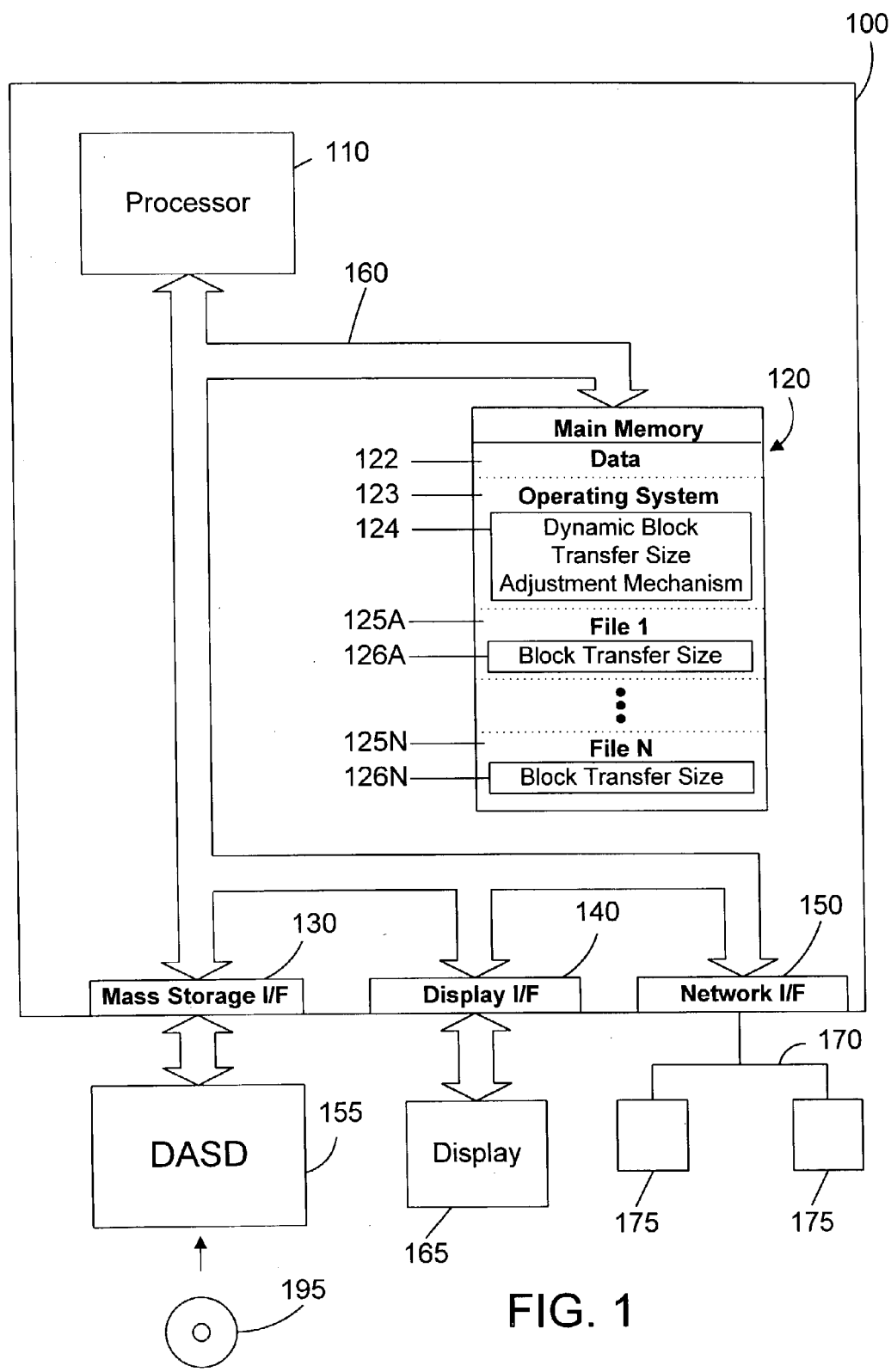
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an eServer iSeries computer system manufactured by International Business Machines Corporation. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, and one or more files 125. FIG. 1 shows N files 125, labeled 125A–125N. The operating system 123 preferably includes a dynamic block transfer size adjustment mechanism 124 that provides autonomic adjustment of block transfer size to enhance system performance. While dynamic block transfer size adjustment mechanism 124 is shown as part of operating system 123 in FIG. 1, the preferred embodiments also extend to a dynamic block transfer size adjustment mechanism 124 that is separate from operating system 123. In addition, the preferred embodiments specifically extend to a dynamic block transfer size adjustment mechanism 124 that resides in an I/O adapter, such as a disk controller.

Each file 125 preferably includes a specified block transfer size 126. Thus, the files 125A–125N in FIG. 1 have corresponding block transfer sizes 126A–126N. Note that the preferred embodiments extend to any suitable memory portion, represented by way of example as file 125 in FIG. 1. Suitable memory portions include files, other virtual storage segments, and physical extents in bulk storage.

In the most preferred implementation, the block transfer size 26 is stored within its corresponding memory portion (e.g., file 125 in FIG. 1). However, the present invention extends to storing the block transfer size for each memory portion in any suitable location, such as in a table accessible by operating system 123 and dynamic block transfer size adjustment mechanism 124.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. The dynamic block transfer size adjustment mechanism 124 dynamically adjusts the block transfer size 126 for a file 125, as needed, according to a compiled history of how the corresponding file 125 has been accessed in the past. The compiled history may be stored in any suitable location in memory. In this manner the dynamic block transfer size adjustment mechanism 124 achieves autonomic adjustment of block transfer size to optimize the performance of computer system 100.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, and files 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 3:
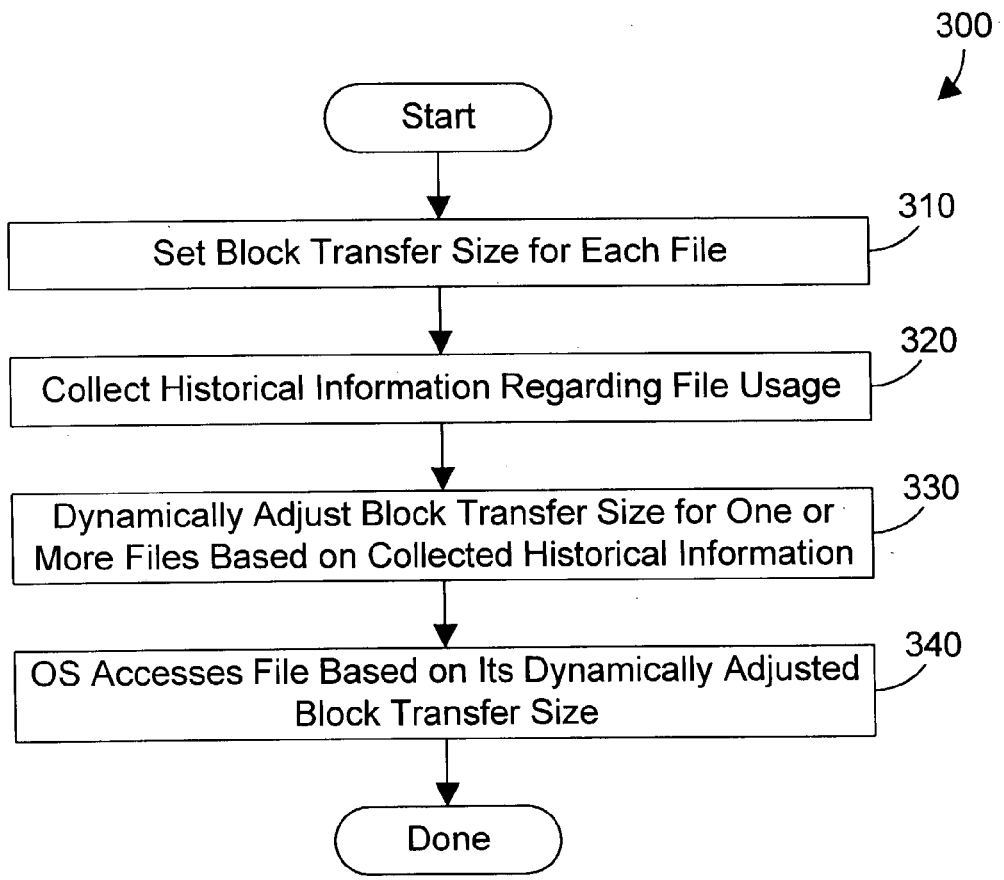
FIG. 3 is a flow diagram of a method in accordance with the preferred embodiments.

Referring to FIG. 3, a method 300 in accordance with the preferred embodiments sets the block transfer size for each file (step 310). Historical information is then collected regarding the usage of the file (step 320). The historical information may be stored in any suitable location in memory. The block transfer size for one or more files may then be dynamically adjusted based on the collected historical information (step 330). The operating system then accesses the file based on its dynamically adjusted block transfer size (step 340).

Figure 2:
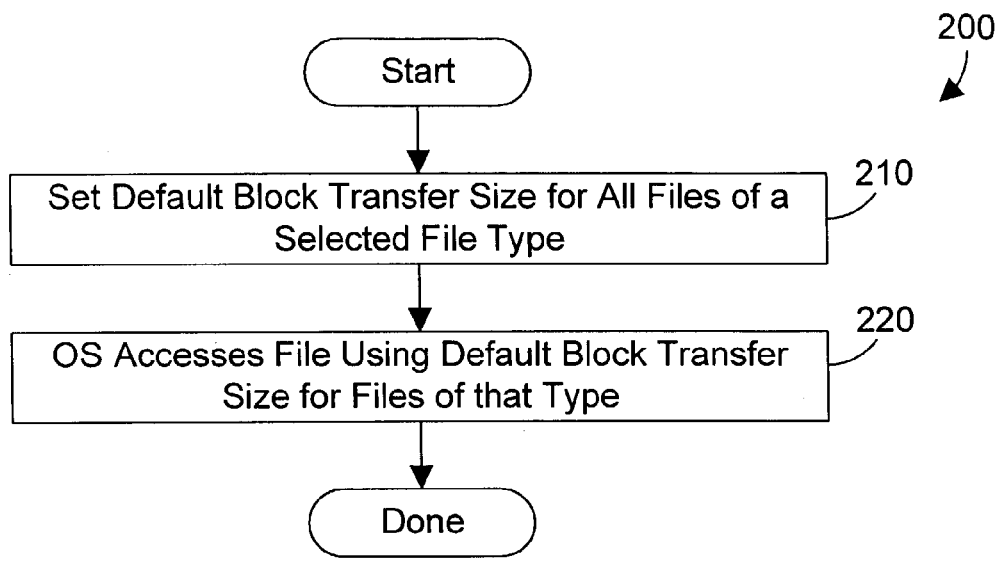
FIG. 2 is a flow diagram of a prior art method for setting and using a default block transfer size for a particular file type.

Method 300 provides a significant advance over prior art method 200 in FIG. 2 in many respects. First, the block transfer size is specified for each file in step 310, instead of specifying a default block transfer size for all files of a particular type in step 210. In this manner, the operating system and memory management system may access a file based on its individual block transfer size. Second, the block transfer size for a file may be dynamically adjusted according to historical usage for the file. Thus, if large portions of the file are typically read at one time, a larger block transfer size may be specified that allows more pages to be retrieved in a single memory operation.

Figure 4:
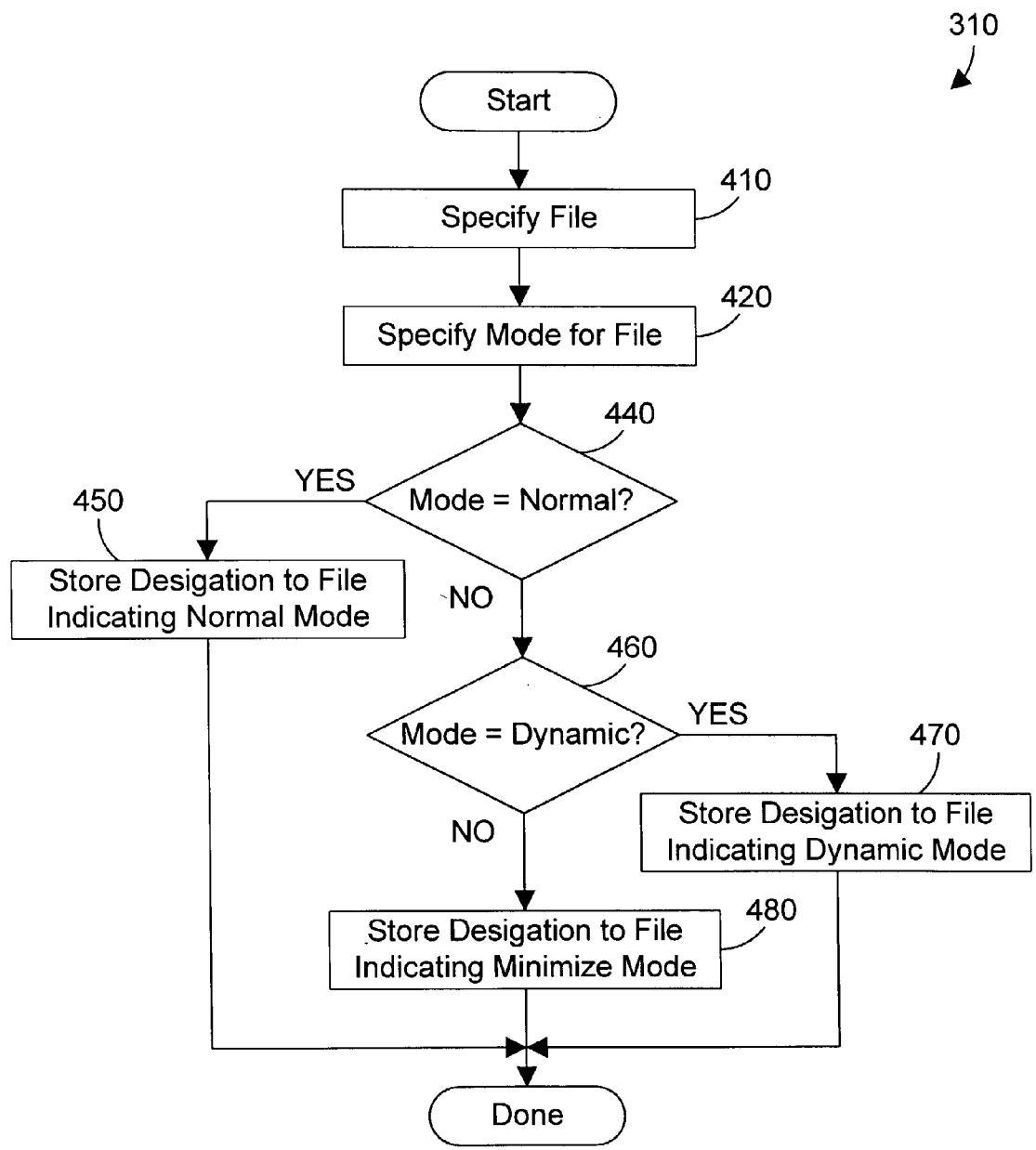
FIG. 4 is a flow diagram of a method in accordance with the preferred embodiments for specifying a mode for each file in a file system.

We now present a specific example to illustrate many of the concepts that relate to the preferred embodiments. FIG. 4 is a method that shows one specific way to specify block transfer size for each file in step 310 in FIG. 3. First, a file is specified (step 410). A mode for the file is then specified (step 420). For this specific example, the mode may be set to "Normal", "Dynamic" or "Minimize". If the mode for the file in step 420 is Normal (step 440=YES), a designation is stored to the file to indicate Normal mode (step 450). In the preferred implementation, a zero is stored in a field in the object's private data to indicate Normal mode. The value of zero for Normal mode is significant because it allows files created on previous releases to default to Normal mode. If the mode is Dynamic (step 440=NO and step 460=YES), a designation is stored to the file to indicate Dynamic mode (step 470). In the preferred implementation, a value of one is stored in the field in the object's private data to indicate Dynamic mode. If the mode is Minimize (step 440=NO and step 460=NO), a designation is stored to the file to indicate Minimize mode (step 480). In the preferred implementation, a value of two is stored in a field in the object's private data to indicate Minimize mode.

We assume a page size of 4K. We further assume for this example that Normal mode defaults to a block transfer size of 16K (four pages); Dynamic mode defaults to a block transfer size of 12K (three pages); and Minimize mode defaults to a block transfer size of 8K (two pages). Normal mode is typically specified for systems that have a relatively large amount of memory. Minimize is typically specified for systems that have a relatively constrained amount of memory. And Dynamic is typically specified when the memory load on the system es expected to dynamically change.

In the most preferred embodiment, a single block transfer size is defined for each memory portion, and the block transfer size for the memory portion may be dynamically changed according to some heuristic that accounts for how the memory portion is accessed by all processes. However, in an alternative embodiment, a separate block transfer size may be defined for each process that accesses a file. By tracking how a file has been accessed by a particular process, it is possible for the dynamic block transfer size adjustment mechanism 124 to define and dynamically change a block transfer size that corresponds to the particular process. In this way, the block transfer size for the file for Process A could be separate and independent from the block transfer size for the same file for Process B. Defining process-specific block transfer size for each file allows the operating system to optimize its access to the file depending on how a particular process accesses the file.

Figure 5:
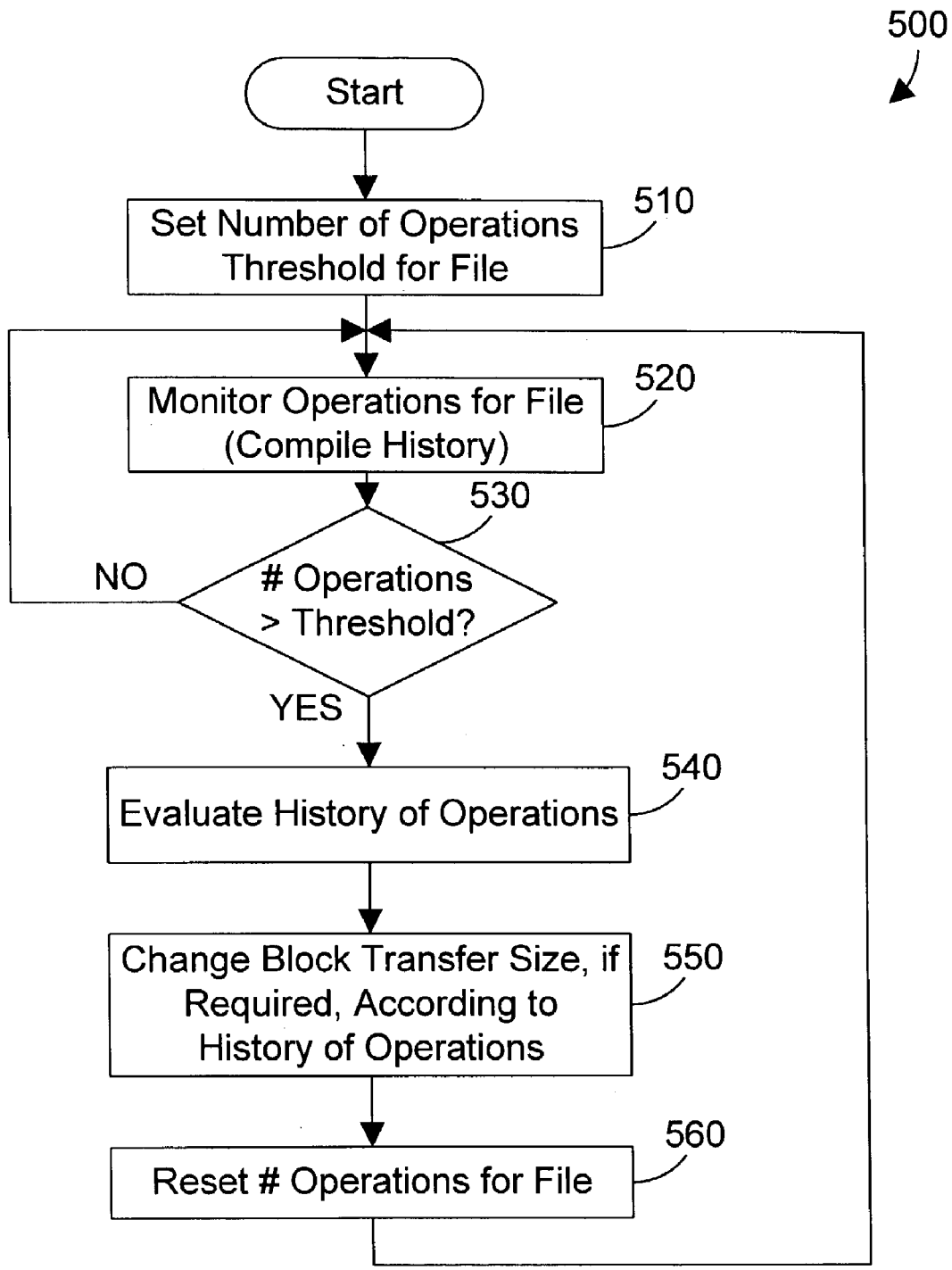
FIG. 5 is a flow diagram of a method in accordance with the preferred embodiments for dynamically adjusting the block transfer size for a file according to how the file is accessed.

Referring to FIG. 5, a method 500 in accordance with the preferred embodiments begins by setting a threshold for the file that defines a certain number of operations (step 510). The operations on the file are then monitored, and a history of operations is compiled (step 520). If the number of operations is not greater than the threshold (step 530=NO), method 500 loops back to step 520. This continues until the number of operations is greater than the threshold (step 530=YES). The history of the operations are evaluated (step 540), the block transfer size is changed, if required, according to the compiled history of the operations (step 550), and the number of operations for the file are reset (step 560).

Step 550 of changing the block transfer size may make immediate and drastic adjustments to block transfer size, if so doing is warranted by the compiled history. Note, however, that the most preferred implementation includes heuristics that prevent the block transfer size from being changed too often or too drastically in one step. For example, for our example with a 4K page size, if the block transfer size is currently set to 8K, and if the history indicates it would be beneficial to change the block transfer size to 16K, instead of making the jump from 8K to 16K, the dynamic block transfer size adjustment mechanism 124 would change the block transfer size from 8K to 12K. As time goes on, if the history indicates it is still beneficial to change the block transfer size to 16K, the dynamic block transfer size adjustment mechanism 124 would change the block transfer size from 12K to 16K in a different step later in time. A timer could also be defined that allows changing the block transfer size only after a minimum time has elapsed from the last change to block transfer size. By only changing the block transfer size one increment at a time, and controlling the time for making the changes, the magnitude of the changes to the block transfer size are minimized, and significant changes to the block transfer size are spread out over a longer period of time to help assure the block transfer size is not being changed too much at one time or too often.

Method 500 in FIG. 5 assumes a single block transfer size that corresponds to a particular file, which is the preferred embodiment. In an alternative embodiment within the scope of the present invention, however, a separate block transfer size may be defined and maintained for each process that accesses a file. In this case, method 500 would apply to the block transfer size for a particular process for the file in question.

FIGS. 6–8 represent pseudo-code that shows one particular implementation in accordance with the preferred embodiments. A class BlockTransferTracker is defined in FIG. 6. This class includes data elements lastEvalTime, operation_Count_During_Evaluation_Interval, evaluation_Number, start_Up_Evaluations, total_Bytes_Read_Or_Written, total_Logical_PageCrossings, and historicalBlockTransferSizes. BlockTransferTracker also defines a method operation( ) on a data_Length, defines a method logicalPageCrossing( ) on a number_Of_Crossings_During_Operation, and defines constructor and destructor methods. Private member functions (or methods) include: calculate_New_Block_Transfer_Size( ) and Dampen_Block_Transfer_Size_Dchange( ) The operation( ) method is shown at the bottom of FIG. 6. First, the operation_Count_During_Evaluation_Interval value is incremented at 610. The total_Bytes_Read_Or_Written variable is incremented by the amount of the data_Length passed as a parameter to the operation( ) method at 620. The value of operation_Count_During_Evaluation_Interval is then compared to a threshold value called Some_Limit, and the currentTime is compared with the lastEvaluationTime to determine if the difference between the two is greater than the MAX_EVALUATION_INTERVAL at 630. This "if" statement at 630 is basically a test to determine if it's time to evaluate the block transfer size. If so, the instructions at 640, 642, 644, and 646 are executed. At 640, the new_Block_Transfer_Size is set to an appropriate value by invoking the getNewBlockTransferSize( ) method. At 642 the evaluation counters are advanced by invoking the method advanceEvaluationCounters( ). At 644 the current statistics are added to the history by invoking the addCurrentStatisticsToHistory( ) method. At 646 the current statistics are reset by invoking the reset_Current_Statistics( ) method.

The operation_Count During Evaluation_Interval variable starts at zero and is incremented once for each operation. This variable is preferably stored in the meta data of the file, preferably in the private data of the file. This variable keeps track of the number of operations performed on the file. When the value of operation_Count_During_Evaluation_Interval exceeds the threshold defined by Some_Limit, an evaluation is performed and the value of operation_Count_During_Evaluation_Interval is reset to zero.

Next, we consider the variable evaluation_Number. This variable is a whole number and is incremented by one each time an evaluation happens. The value of this variable will range from 0 to M−1, where M is the size of the array historicalBlockTransferSizes. This gives evaluation_Number M unique values, starting at zero and altered by the formula evaluation_Number=evaluation_Number+1 mod M. The evaluation_Number will be used to index into the array historicalBlockTransferSizes, which has M entries representing a history of up to M evaluations. It is important to recognize when we have experienced at least M evaluation periods so we know when to start recycling them.

The variable start_Up_Evaluations tracks the number of evaluations from 0 up to M. Once the value of start_Up_Evaluations reaches M, it will stay at that level. This gives a simple mechanism to track the number of valid entries in the array of historical statistics. The logic to modify start_Up_Evaluations is therefore: if start_Up_Evaluations <M then start_Up_Evaluations=start_Up_Evaluations+1. This logic will be performed when evaluation_Number is incremented.

In the preferred embodiments, more weight is given to the more recent history. A simple weighted average is one suitable way to give appropriate weightings between different evaluations. For example, the weight for the most recent evaluation could be set to a value of M; the weight for the previous evaluation could be set to a value of M−1; and the weight for the nth oldest evaluation may be set to a value of M−N.

We assume that variable LastEvalTime contains the time in some convenient form when the last evaluation was performed. If the file has never been evaluated, this field may contain the time the file was created.

A high, abstract view of a read function is represented in FIG. 7. In this implementation, a reference to an object of type BlockTransferTracker is passed as an argument. This is for illustration purposes. In the preferred embodiments, the BlockTransferTracker objects reside inside the private data portion of the file's private meta data and is immediately accessible from the read and write run-time routines. It is shown in FIG. 7 as an argument to illustrate that the read function has access to this object. The Read_Function( ) method includes the steps of moving data from a file into a user buffer at 710, after which the operation( ) method on the blockTransferTracker object is invoked at 720, passing the length of the data that was just moved in the previous operation. In this manner, the Read_Function first moves the data, then informs the blockTransferTracker object of how much data was moved.

The Move_Data_From_File_Into_User_Buffer( ) method is shown in abstract form in FIG. 8. For each virtual storage segment being touched by this read, the following steps are performed: a) determine the location within the segment where the data starts; b) determine where within the segment the data ends; c) determine how many logical page crossings will occur when the data is moved from the segment into the user buffer; and d) invoke the logicalPageCrossers( ) method on the blockTransferTracker object to inform the object how many logical crossings were encountered during the read of this segment.

Other optimizations may also be added. For example, using the information in FIG. 8 regarding the number of logical page crossings, it is possible for the memory subsystem to read all of the pages in a single I/O operation, thereby minimizing the number of I/O operations required to read the data. In addition, an optimization regarding the writing of the data could occur when the start of the read data occurs at the start of a physical page and the end occurs at the end of a physical page. In this case, pages may be acquired and cleared to zero, followed by writing the data to the pages. This eliminates the need of retrieving those pages from memory, since all of their data will be overwritten anyway. Both of these optimizations above are preferably performed for files that have a mode of MINIMIZE, or that have a mode of DYNAMIC when system memory resources are constrained.

The preferred embodiments allow a computer system to define and autonomically adjust block transfer size on any suitable memory portion, including files, virtual storage segments, and physical extents. In addition, in an alternative embodiment, a block transfer size may be defined for each process that accesses a file. This allows the block transfer size to be dynamically adjusted for each process according to the history of that process accessing the corresponding file. By dynamically adjusting the block transfer size, the response time observed by users of applications executing on a computer system may be improved, or may be preserved from degrading. In addition, the dynamic adjustment of block transfer size decreases the contention for main storage, reduces the number of page faults, and reduces the number of disk I/O operations.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the block transfer size is disclosed herein to be a multiple of the page size. However, the present invention expressly extends to any value or increment for block transfer size.

What is claimed is:

1. An apparatus comprising:
   at least one processor;
   a memory coupled to the at least one processor;
   a plurality of memory portions that each have a specified block transfer size independent of block transfer size of other of the plurality of memory portions, wherein the specified block transfer size for a selected memory portion determines size of each block transferred from the selected memory portion when the selected memory portion is accessed;
   an operating system residing in the memory and executed by the at least one processor, the operating system accessing each of the plurality of memory portions using the corresponding specified block transfer size; and
   a dynamic block transfer size adjustment mechanism that compiles a history of how a selected memory portion is accessed and that dynamically adjusts the block transfer size of the memory portion, as required, according to the compiled history.

2. The apparatus of claim 1 wherein each memory portion comprises a file.

3. The apparatus of claim 1 wherein each memory portion comprises a virtual storage segment.

4. The apparatus of claim 1 wherein each memory portion comprises an extent of physical storage.

5. The apparatus of claim 1 wherein the specified block transfer size for a memory portion comprises an independent block transfer size for each process that accesses the memory portion.

6. An apparatus comprising:
   at least one processor;
   a memory coupled to the at least one processor;
   a plurality of files that each have a specified block transfer size independent of block transfer size of other of the plurality of files, wherein the specified block transfer size for a selected file determines size of each block transferred from the selected file when the selected file is accessed;
   an operating system residing in the memory and executed by the at least one processor, the operating system accessing each of the plurality of files using the corresponding specified block transfer size; and
   a dynamic block transfer size adjustment mechanism that compiles a history of how a selected file is accessed and that dynamically adjusts the block transfer size of the file, as required, according to the compiled history.

7. The apparatus of claim 6 wherein the specified block transfer size for a memory portion comprises an independent block transfer size for each process that accesses the memory portion.

8. A computer-implemented method for accessing information in a memory portion, the method comprising the steps of:
   specifying block transfer size for the memory portion independently from block transfer size of other memory portions, wherein the specified block transfer size for the memory portion determines size of each block transferred from the memory portion when the memory portion is accessed;
   accessing the memory portion using the corresponding specified block transfer size;
   compiling a history of how the memory portion is accessed; and
   dynamically adjusting the block transfer size of the memory portion, as required, according to the compiled history.

9. The method of claim 8 wherein each memory portion comprises a file.

10. The method of claim 8 wherein each memory portion comprises a virtual storage segment.

11. The method of claim 8 wherein each memory portion comprises an extent of physical storage.

12. The method of claim 8 wherein the step of specifying block transfer size for the memory portion specifies block transfer size for a selected process that accesses the memory portion independently of block transfer size for other processes that access the memory portion.

13. A computer-implemented method for accessing information in a file, the method comprising the steps of:
   specifying block transfer size for the file independently from block transfer size of other files, wherein the specified block transfer size for the file determines size of each block transferred from the file when the file is accessed;
   accessing the file using the corresponding specified block transfer size;
   compiling a history of how the file is accessed; and
   dynamically adjusting the block transfer size of the file, as required, according to the compiled history.

14. The method of claim 13 wherein the step of specifying block transfer size for the file specifies block transfer size for a selected process that accesses the file independently of block transfer size for other processes that access the file.

15. A computer-readable program product comprising:
   (A) a dynamic block transfer size adjustment mechanism that compiles a history of how a selected memory portion is accessed and that dynamically adjusts block transfer size of the memory portion, as required, according to the compiled history, wherein the block transfer size for the selected memory portion determines size of each block transferred from the selected memory portion when the selected memory portion is accessed; and
   (B) recordable media bearing the dynamic block transfer size adjustment mechanism.

16. The program product of claim 15 wherein each memory portion comprises a file.

17. The program product of claim 15 wherein each memory portion comprises a virtual storage segment.

18. The program product of claim 15 wherein each memory portion comprises an extent of physical storage.

19. The program product of claim 15 wherein the block transfer size for a memory portion comprises an independent block transfer size for each process that accesses the memory portion.

20. A computer-readable program product comprising:
(A) a dynamic block transfer size adjustment mechanism that compiles a history of how a selected file is accessed and that dynamically adjusts block transfer size of the file, as required, according to the compiled history, wherein the block transfer size for the file determines size of each block transferred from the file when the file is accessed; and
(B) recordable media bearing the dynamic block transfer size adjustment mechanism.

21. The program product of claim 20 wherein the block transfer size for a memory portion comprises an independent block transfer size for each process that accesses the memory portion.

* * * * *